(12) United States Patent
Sobecki et al.

(10) Patent No.: US 11,851,080 B2
(45) Date of Patent: Dec. 26, 2023

(54) VEHICULAR DRIVER MONITORING SYSTEM WITH POSTURE DETECTION AND ALERT

(71) Applicant: Magna Mirrors of America, Inc., Holland, MI (US)

(72) Inventors: Justin E. Sobecki, Rockford, MI (US); Austen C. Peterson, Grand Rapids, MI (US)

(73) Assignee: Magna Mirrors of America, Inc., Holland, MI (US)

( * ) Notice: Subject to any disclaimer, the term of this patent is extended or adjusted under 35 U.S.C. 154(b) by 0 days.

(21) Appl. No.: 17/649,723

(22) Filed: Feb. 2, 2022

(65) Prior Publication Data

US 2022/0242438 A1 Aug. 4, 2022

Related U.S. Application Data

(60) Provisional application No. 63/199,918, filed on Feb. 3, 2021.

(51) Int. Cl.
*B60W 50/16* (2020.01)
*G06V 20/59* (2022.01)
*B60R 1/04* (2006.01)
*B60R 11/04* (2006.01)
*B60W 40/08* (2012.01)
*B60W 50/14* (2020.01)
(Continued)

(52) U.S. Cl.
CPC .............. *B60W 50/16* (2013.01); *B60R 1/04* (2013.01); *B60R 11/04* (2013.01); *B60W 40/08* (2013.01); *G06V 20/597* (2022.01); *B60R 2001/1215* (2013.01); *B60R 2011/0033* (2013.01); *B60W 2050/143* (2013.01); *B60W 2050/146* (2013.01); *B60W 2420/403* (2013.01); *B60W 2540/223* (2020.02)

(58) Field of Classification Search
CPC ................. B60W 50/16; B60W 40/08; B60W 2050/143; B60W 2050/146; B60W 2540/223; B60R 1/04; B60R 2001/1215; G06V 20/597
See application file for complete search history.

(56) References Cited

U.S. PATENT DOCUMENTS

| 2,263,382 A | 11/1941 | Gotzinger |
| 2,580,014 A | 12/1951 | Gazda |

(Continued)

FOREIGN PATENT DOCUMENTS

| CN | 113384266 A * | 9/2021 |
| WO | 2022187805 A1 | 9/2022 |

(Continued)

*Primary Examiner* — Mohamed Barakat
(74) *Attorney, Agent, or Firm* — HONIGMAN LLP

(57) ABSTRACT

A vehicular driver monitoring system includes a camera disposed in a cabin of a vehicle and viewing a driver operating of the vehicle. The camera captures image data and provides captured image data to an electronic control unit (ECU). The vehicular driver monitoring system, via processing captured image data at the ECU, determines posture of the driver operating the vehicle. Responsive to the determined posture of the driver being indicative of at least a threshold degree of improper posture, the vehicular driver monitoring system generates an alert to the driver that the driver has improper posture.

28 Claims, 3 Drawing Sheets

(51) Int. Cl.
   *B60R 1/12*    (2006.01)
   *B60R 11/00*   (2006.01)

(56) References Cited

U.S. PATENT DOCUMENTS

| | | |
|---|---|---|
| 3,266,016 A | 8/1966 | Maru |
| 4,499,451 A | 2/1985 | Suzuki et al. |
| 4,588,267 A | 5/1986 | Pastore |
| 4,623,222 A | 11/1986 | Itoh et al. |
| 4,630,904 A | 12/1986 | Pastore |
| 4,721,364 A | 1/1988 | Itoh et al. |
| 4,906,085 A | 3/1990 | Sugihara et al. |
| 5,313,335 A | 5/1994 | Gray et al. |
| 5,355,284 A | 10/1994 | Roberts |
| 5,436,741 A | 7/1995 | Crandall |
| 5,481,409 A | 1/1996 | Roberts |
| 5,550,677 A | 8/1996 | Schofield et al. |
| 5,567,360 A | 10/1996 | Varaprasad et al. |
| 5,570,127 A | 10/1996 | Schmidt |
| 5,575,552 A | 11/1996 | Faloon et al. |
| 5,587,699 A | 12/1996 | Faloon et al. |
| 5,668,663 A | 9/1997 | Varaprasad et al. |
| 5,670,935 A | 9/1997 | Schofield et al. |
| 5,760,962 A | 6/1998 | Schofield et al. |
| 5,786,772 A | 7/1998 | Schofield et al. |
| 5,788,357 A | 8/1998 | Muth et al. |
| 5,796,094 A | 8/1998 | Schofield et al. |
| 5,877,897 A | 3/1999 | Schofield et al. |
| 5,938,320 A | 8/1999 | Crandall |
| 6,005,724 A | 12/1999 | Todd |
| 6,045,243 A | 4/2000 | Muth et al. |
| 6,097,023 A | 8/2000 | Schofield et al. |
| 6,111,683 A | 8/2000 | Cammenga et al. |
| 6,158,655 A | 12/2000 | DeVries, Jr. et al. |
| 6,257,746 B1 | 7/2001 | Todd et al. |
| 6,264,353 B1 | 7/2001 | Caraher et al. |
| 6,356,376 B1 | 3/2002 | Tonar et al. |
| 6,483,438 B2 | 11/2002 | DeLine et al. |
| 6,512,624 B2 | 1/2003 | Tonar et al. |
| 6,593,565 B2 | 7/2003 | Heslin et al. |
| 6,627,918 B2 | 9/2003 | Getz et al. |
| 6,690,268 B2 | 2/2004 | Schofield et al. |
| 6,700,692 B2 | 3/2004 | Tonar et al. |
| 6,703,925 B2 | 3/2004 | Steffel |
| 6,824,281 B2 | 11/2004 | Schofield et al. |
| 7,038,577 B2 | 5/2006 | Pawlicki et al. |
| 7,184,190 B2 | 2/2007 | McCabe et al. |
| 7,195,381 B2 | 3/2007 | Lynam et al. |
| 7,224,324 B2 | 5/2007 | Quist et al. |
| 7,249,860 B2 | 7/2007 | Kulas et al. |
| 7,253,723 B2 | 8/2007 | Lindahl et al. |
| 7,255,451 B2 | 8/2007 | McCabe et al. |
| 7,274,501 B2 | 9/2007 | McCabe et al. |
| 7,289,037 B2 | 10/2007 | Uken et al. |
| 7,338,177 B2 | 3/2008 | Lynam |
| 7,360,932 B2 | 4/2008 | Uken et al. |
| 7,420,756 B2 | 9/2008 | Lynam |
| 7,480,149 B2 | 1/2009 | DeWard et al. |
| 7,626,749 B2 | 12/2009 | Baur et al. |
| 7,720,580 B2 | 5/2010 | Higgins-Luthman |
| 7,777,611 B2 | 8/2010 | Desai |
| 7,855,755 B2 | 12/2010 | Weller et al. |
| 7,914,187 B2 | 3/2011 | Higgins-Luthman et al. |
| 8,049,640 B2 | 11/2011 | Uken et al. |
| 8,258,932 B2 | 9/2012 | Wahlstrom |
| 8,446,470 B2 | 5/2013 | Lu et al. |
| 8,451,107 B2 | 5/2013 | Lu et al. |
| 8,508,831 B2 | 8/2013 | De Wind et al. |
| 8,529,108 B2 | 9/2013 | Uken et al. |
| 8,730,553 B2 | 5/2014 | De Wind et al. |
| 8,743,203 B2 | 6/2014 | Karner et al. |
| 8,876,342 B2 | 11/2014 | Wimbert et al. |
| 9,090,213 B2 | 7/2015 | Lawlor et al. |
| 9,126,525 B2 * | 9/2015 | Lynam ............... B60W 40/02 |
| 9,174,578 B2 | 11/2015 | Uken et al. |
| 9,346,403 B2 | 5/2016 | Uken et al. |
| 9,405,120 B2 | 8/2016 | Graf et al. |
| 9,487,159 B2 | 11/2016 | Achenbach |
| 9,493,122 B2 | 11/2016 | Krebs |
| 9,598,016 B2 | 3/2017 | Blank et al. |
| 9,609,757 B2 | 3/2017 | Steigerwald |
| 9,827,913 B2 | 11/2017 | De Wind et al. |
| 9,878,669 B2 | 1/2018 | Kendall |
| 9,900,490 B2 | 2/2018 | Ihlenburg et al. |
| 10,017,114 B2 | 7/2018 | Bongwald |
| 10,029,614 B2 | 7/2018 | Larson |
| 10,046,706 B2 | 8/2018 | Larson et al. |
| 10,065,574 B2 | 9/2018 | Tiryaki |
| 10,166,924 B2 | 1/2019 | Baur |
| 10,166,926 B2 | 1/2019 | Krebs et al. |
| 10,261,648 B2 | 4/2019 | Uken et al. |
| 10,315,573 B2 | 6/2019 | Bongwald |
| 10,421,404 B2 | 9/2019 | Larson et al. |
| 10,442,360 B2 | 10/2019 | LaCross et al. |
| 10,466,563 B2 | 11/2019 | Kendall et al. |
| 10,567,633 B2 | 2/2020 | Ihlenburg et al. |
| 10,567,705 B2 | 2/2020 | Ziegenspeck et al. |
| 10,703,204 B2 | 7/2020 | Hassan et al. |
| 10,922,563 B2 | 2/2021 | Nix et al. |
| 11,205,083 B2 | 12/2021 | Lynam |
| 11,214,199 B2 | 1/2022 | LaCross et al. |
| 11,240,427 B2 | 2/2022 | Koravadi |
| 11,242,008 B2 | 2/2022 | Blank et al. |
| 11,252,376 B2 | 2/2022 | Ihlenburg |
| 11,341,671 B2 | 5/2022 | Lu et al. |
| 11,348,374 B2 | 5/2022 | Kramer et al. |
| 11,433,906 B2 | 9/2022 | Lu |
| 11,465,561 B2 | 10/2022 | Peterson et al. |
| 11,488,399 B2 | 11/2022 | Wacquant |
| 11,493,918 B2 | 11/2022 | Singh |
| 11,518,401 B2 | 12/2022 | Kulkarni |
| 11,582,425 B2 | 2/2023 | Liu |
| 2002/0005999 A1 | 1/2002 | Hutzel et al. |
| 2006/0050018 A1 | 3/2006 | Hutzel et al. |
| 2007/0182528 A1 | 8/2007 | Breed et al. |
| 2009/0040778 A1 | 2/2009 | Takayanagi et al. |
| 2010/0085653 A1 | 4/2010 | Uken et al. |
| 2011/0080481 A1 | 4/2011 | Bellingham |
| 2014/0022390 A1 | 1/2014 | Blank et al. |
| 2014/0285666 A1 | 9/2014 | O'Connell et al. |
| 2014/0293169 A1 | 10/2014 | Uken et al. |
| 2014/0313563 A1 | 10/2014 | Uken et al. |
| 2014/0336876 A1 | 11/2014 | Gieseke et al. |
| 2015/0009010 A1 | 1/2015 | Biemer |
| 2015/0015710 A1 | 1/2015 | Tiryaki |
| 2015/0022664 A1 | 1/2015 | Pflug et al. |
| 2015/0092042 A1 | 4/2015 | Fursich |
| 2015/0097955 A1 | 4/2015 | De Wind et al. |
| 2015/0232030 A1 | 8/2015 | Bongwald |
| 2015/0294169 A1 | 10/2015 | Zhou et al. |
| 2015/0296135 A1 | 10/2015 | Wacquant et al. |
| 2015/0352953 A1 | 12/2015 | Koravadi |
| 2016/0137126 A1 | 5/2016 | Fursich et al. |
| 2016/0209647 A1 | 7/2016 | Fursich |
| 2017/0158054 A1 * | 6/2017 | Munaoka ............... G08B 5/38 |
| 2017/0161575 A1 * | 6/2017 | Banno ............... A61B 5/6893 |
| 2017/0197523 A1 | 7/2017 | Magaña ............... B60N 2/0244 |
| 2017/0210357 A1 * | 7/2017 | Nagai ............... G06V 20/597 |
| 2017/0217367 A1 | 8/2017 | Pflug et al. |
| 2017/0237946 A1 | 8/2017 | Schofield et al. |
| 2017/0274906 A1 | 9/2017 | Hassan et al. |
| 2017/0355312 A1 | 12/2017 | Habibi et al. |
| 2018/0134217 A1 | 5/2018 | Peterson et al. |
| 2018/0222414 A1 | 8/2018 | Ihlenburg et al. |
| 2018/0231976 A1 | 8/2018 | Singh |
| 2019/0047475 A1 | 2/2019 | Uken et al. |
| 2019/0054899 A1 | 2/2019 | Hoyos et al. |
| 2019/0118717 A1 | 4/2019 | Blank et al. |
| 2019/0146297 A1 | 5/2019 | Lynam et al. |
| 2019/0168669 A1 | 6/2019 | Lintz et al. |
| 2019/0258131 A9 | 8/2019 | Lynam et al. |
| 2019/0364199 A1 | 11/2019 | Koravadi |
| 2019/0381938 A1 | 12/2019 | Hopkins |
| 2020/0143560 A1 | 5/2020 | Lu et al. |

(56) References Cited

U.S. PATENT DOCUMENTS

| | | |
|---|---|---|
| 2020/0148120 A1 | 5/2020 | Englander et al. |
| 2020/0202151 A1 | 6/2020 | Wacquant |
| 2020/0320320 A1 | 10/2020 | Lynam |
| 2020/0327323 A1 | 10/2020 | Noble |
| 2020/0377022 A1 | 12/2020 | LaCross et al. |
| 2021/0052206 A1* | 2/2021 | Kale ................. G06V 10/82 |
| 2021/0056306 A1 | 2/2021 | Hu et al. |
| 2021/0122404 A1 | 4/2021 | Lisseman et al. |
| 2021/0155167 A1 | 5/2021 | Lynam et al. |
| 2021/0162926 A1 | 6/2021 | Lu |
| 2021/0197747 A1* | 7/2021 | Yoshizawa ........... G06V 20/597 |
| 2021/0245662 A1 | 8/2021 | Blank et al. |
| 2021/0291739 A1 | 9/2021 | Kasarla et al. |
| 2021/0306538 A1 | 9/2021 | Solar |
| 2021/0323473 A1 | 10/2021 | Peterson et al. |
| 2021/0368082 A1 | 11/2021 | Solar |
| 2022/0084316 A1* | 3/2022 | Wang .................. G06V 10/443 |
| 2022/0111857 A1 | 4/2022 | Kulkarni |
| 2022/0242438 A1 | 8/2022 | Sobecki et al. |
| 2022/0254132 A1 | 8/2022 | Rother |
| 2022/0377219 A1 | 11/2022 | Conger et al. |

FOREIGN PATENT DOCUMENTS

| | | |
|---|---|---|
| WO | 2022241423 A1 | 11/2022 |
| WO | 2023034956 | 3/2023 |

\* cited by examiner

VEHICULAR DRIVER MONITORING SYSTEM WITH POSTURE DETECTION AND ALERT

CROSS REFERENCE TO RELATED APPLICATION

The present application claims the filing benefits of U.S. provisional application Ser. No. 63/199,918, filed Feb. 3, 2021, which is hereby incorporated herein by reference in its entirety.

FIELD OF THE INVENTION

The present invention relates to vehicular vision systems that use one or more cameras of a vehicle to monitor a driver of the vehicle and/or display video images derived from image data captured by the cameras of the vehicle.

BACKGROUND OF THE INVENTION

It is known to provide a video display at the exterior rearview mirror assembly, such as described in U.S. Pat. No. 7,777,611, which is hereby incorporated herein by reference in its entirety, or to provide a video display at an interior rearview mirror assembly to display sideward and/or rearward images, such as described in U.S. Pat. No. 5,670,935, which is hereby incorporated herein by reference in its entirety. A variety of interior and exterior mirror assemblies with indicators are known in the art, such as U.S. Pat. Nos. 5,668,663; 5,355,284; 5,788,357; 6,257,746; 6,005,724; 5,481,409; 6,111,683; 6,045,243; 6,264,353; 6,512,624; 6,356,376; 2,263,382; 2,580,014; 3,266,016; 4,499,451; 4,588,267; 4,630,904; 4,623,222; 4,721,364; 4,906,085; 5,313,335; 5,587,699; 5,575,552; 5,436,741; 5,587,699; 5,938,320; 6,700,692 and 5,786,772, which are all hereby incorporated herein by reference in their entireties.

SUMMARY OF THE INVENTION

A driver monitoring system (DMS) includes a camera that views a driver's head and body region in the vehicle cabin and an image processor that processes image data captured by the camera to determine posture of the driver sitting in the driver seat of the vehicle. The system may also or otherwise include a camera that views a passenger's head and body region at a passenger seat in the vehicle cabin, whereby the image processor processes image data captured by the passenger-viewing camera to determine posture of the passenger sitting in the passenger seat of the vehicle. The system, responsive to determination (via processing by the image processor of image data captured by the camera) that the driver's posture is poor (outside of a threshold range of acceptable postures or positions), generates an alert to the driver (or passenger) so the driver (or passenger) can improve his or her posture.

The system includes an electronic control unit (ECU) of the vehicle that receives image data captured by the camera and that may include the image processor for processing the captured image data. The ECU may output (such as via a coaxial cable) a signal to a video display of the interior rearview mirror assembly for displaying video images at the display screen based on the captured image data or for displaying a visible alert at the mirror reflective element of the interior rearview mirror assembly.

These and other objects, advantages, purposes and features of the present invention will become apparent upon review of the following specification in conjunction with the drawings.

DESCRIPTION OF THE PREFERRED EMBODIMENTS

Figure 1:
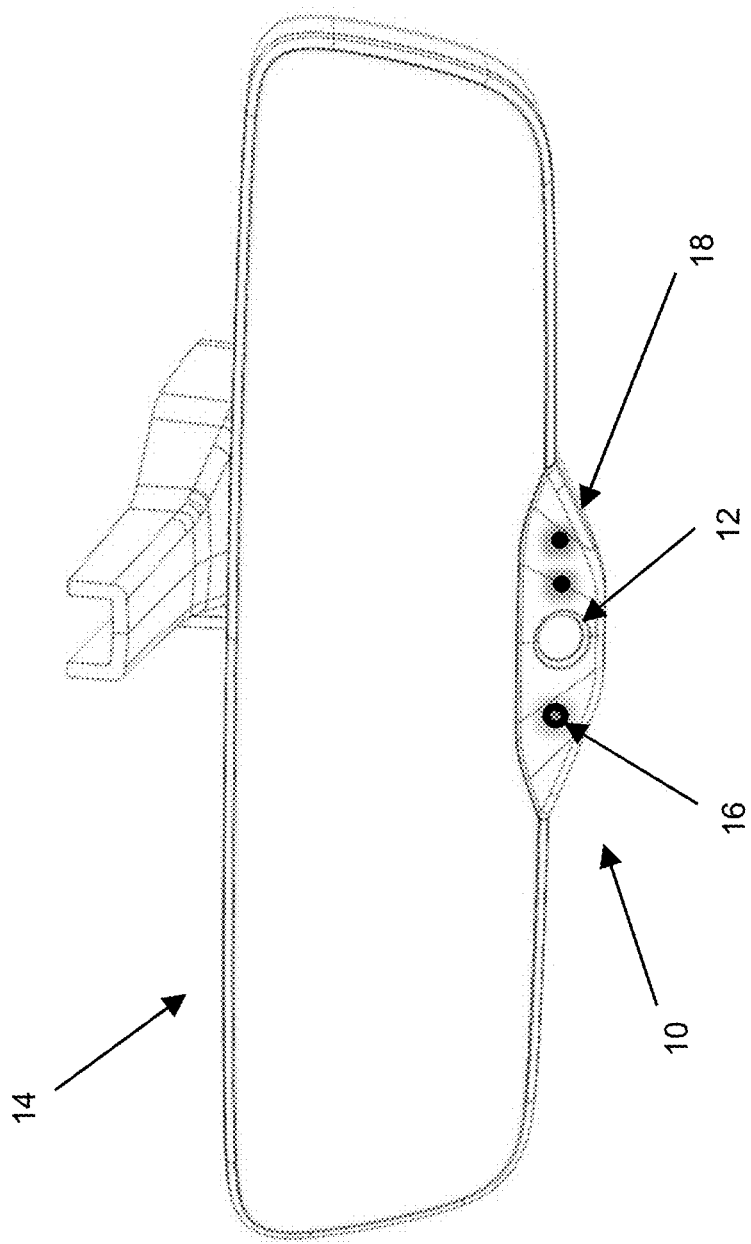
FIG. 1 is a perspective view of an interior rearview mirror assembly having a driver monitoring and posture alert system.
Figure 2:
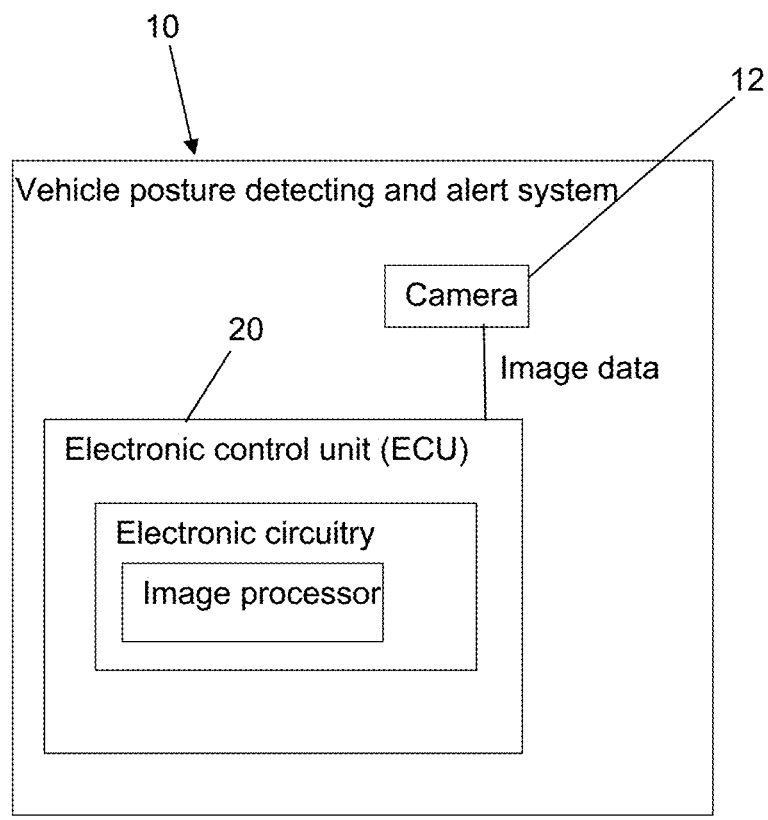
FIG. 2 is a schematic block diagram of a vehicle posture detecting and alert system.

A vehicle vision system and/or driver or driving assist system and/or driver monitoring system and/or alert system operates to capture images interior of the vehicle and may process the captured image data to monitor the driver of the vehicle (and/or one or more passengers of the vehicle). The system includes an image processor or image processing system that is operable to receive image data from one or more cameras and to provide an output to one or more alert devices or display devices for alerting the driver and/or passenger.

Referring now to the drawings and the illustrative embodiments depicted therein, a driver monitoring and posture alert system 10 includes a driver monitoring camera 12 that is disposed at an interior rearview mirror assembly 14 of the vehicle. The system 10 also includes a posture indicator 16 (such as one or more visible light-emitting light emitting diodes (LEDs)) and may also include one or more illumination devices 18 (such as one or more infrared LEDs) for illuminating the driver region to enhance image capture of the driver during low ambient lighting conditions.

The system 10 uses one or more driver monitoring system (DMS) cameras 12 (such as one that views the driver seat region of the vehicle and one that views the passenger seat region of the vehicle or a single camera that views both seat regions) to analyze and monitor the driver's and/or passenger's posture. The system 10 may allow for users to set their ideal posture position (such as via pressing a button or otherwise actuating a user input or human machine interface (HMI) to save the user's current posture as a baseline or target posture) or the system 10 may automatically define the ideal posture by analyzing the person's head and spine positions relative to the key features of the vehicle (e.g., relative to the vehicle seat, steering wheel, mirror, etc.).

Figure 3:
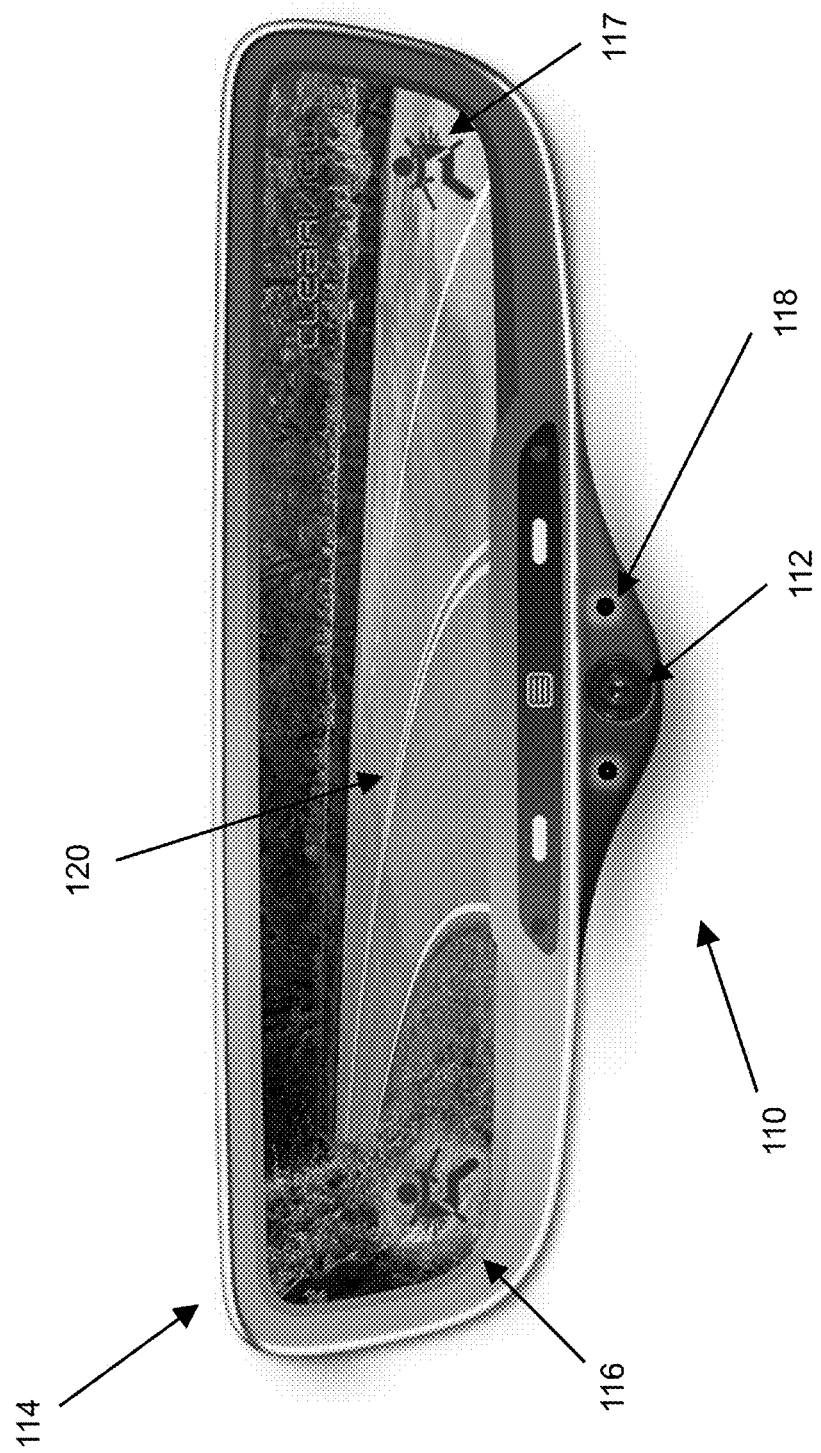
FIG. 3 is a perspective view of another interior rearview mirror assembly having another driver monitoring and posture alert system.

Referring to FIG. 3, the system 10 includes a control or electronic control unit (ECU) 20 having electronic circuitry and associated software, with the electronic circuitry including a data processor or image processor that is operable to process image data captured by the camera or cameras 12, whereby the ECU may monitor the driver and/or passenger. The controller or ECU (having electronic circuitry including an image processor) processes image data captured by the DMS camera 12 (and optionally or otherwise one or more other posture detecting cameras disposed within the cabin of the vehicle and viewing one or more seating areas in the vehicle) to determine the current posture of the driver or passenger. Responsive to determining that the driver's posture is more than a threshold amount outside of or different than the determined or selected proper posture, the system generates an alert to warn the driver when the driver's posture becomes poor.

Thus, the driver, when initially operating the vehicle, may actuate a "proper posture" input and the system may capture image data representative of the driver in the proper posture. The proper posture image data is stored in memory for use during that driving maneuver or trip by that driver and optionally for future driving maneuvers or trips by that driver. The system may also include a driver identification feature to determine if the driver in the vehicle is a driver that has previously stored proper posture data. While the driver operates the vehicle, the system may continuously or episodically monitor the driver and compare the determined current driver posture to the stored proper posture data. If the system determines that the driver's determined current posture differs from the stored proper posture by a threshold amount (e.g., the driver's head tilts or the driver slouches by more than a threshold amount compared to the stored posture data), the system generates an alert to the driver so the driver can adjust his or her posture back towards the proper posture/position.

The alert may comprise an audible sound (via one or more speakers in the vehicle), a verbal warning (via one or more speakers in the vehicle), a seat vibration (or steering wheel vibration or other suitable haptic alert), a light indicator 16, a light indicator 16 that changes color/brightness depending on how bad/good the posture is (e.g., a light that is green when the posture is good, and red when the posture is bad). Optionally, the light indicator 16 may comprise a single LED that simply lights up when the system 10 determines bad posture, or the light indicator 16 may comprise two LEDs (or a single LED that can emit different colors of light) such that red light is emitted when posture is determined to be poor and green light is emitted when posture is determined to be good. Optionally, the light indicator 16 may comprise a plurality of LEDs arranged in a row or column, where the number of LEDs (and optionally color too) energized changes with the determined degree of bad posture.

Although shown and described as having the camera 12 and alert device at the interior rearview mirror assembly 14, the monitoring and posture alert system 10 may be located at the instrument panel or at a center console or overhead console of the interior cabin of the vehicle.

As shown in FIG. 1, the visible posture indicator or alert may comprise a light indicator 16 at the mirror head that illuminates to provide indication to the driver that is representative of the driver's posture. For example, the indicator 16 may be off and only activated when the posture is determined to be poor. In such an application, the indicator 16 may comprise a red indicator to indicate the poor posture when the indicator 16 is energized. Optionally, the indicator 16 may provide green light when the posture is determined to be good (within a threshold range of the targeted posture) and may provide red light when the posture is determined to be bad (outside of the threshold range of the targeted posture). The indicator 16 may flash red if the posture is outside of a further threshold range (very bad posture) or if the posture is determined to be bad for longer than a threshold period of time, in order to increase the likelihood that the driver sees the alert.

Optionally, and such as shown in FIG. 3, the driver monitoring and posture alert system 110 includes a driver monitoring system camera 112 and DMS illumination device 118 disposed at an interior rearview mirror assembly 114. The interior rearview mirror assembly may comprise a full mirror video display screen 120 disposed behind the mirror reflective element that is operable to display video images derived from image data captured by one or more exterior viewing cameras of the vehicle. The cameras may provide rearward video images for such a dual-mode interior rearview video mirror, which can switch from a traditional reflection mode to a live-video display mode, such as by utilizing aspects of the mirror assemblies and systems described in U.S. Pat. Nos. 10,442,360; 10,421,404; 10,166,924; 10,046,706; 10,029,614 and/or U.S. Publication Nos. US-2021-0245662; US-2021-0162926; US-2021-0155167; US-2019-0258131; US-2019-0146297; US-2019-0118717; US-2019-0047475 and/or US-2017-0355312, and/or International PCT Application No. PCT/US22/70062, filed Jan. 6, 2022, which are all hereby incorporated herein by reference in their entireties.

The system 110 provides a posture indicator 116 at the video display screen, such as via a graphic overlay or iconistic display at the display screen. In the illustrated embodiment, the indicator 116 provides an iconistic representation of a driver with bad posture (and may be displayed as a red color) to alert the driver of his or her bad posture. The color and/or intensity of the iconistic indicator 116 may be adjusted responsive to the degree of bad posture and/or time that the driver (or passenger) maintains the bad posture. Optionally, the iconistic indicator 116 may flash and/or be accompanied by an audible alert based at least in part on the degree of bad posture and/or time that the driver (or passenger) maintains the bad posture. Similarly, the system 110 may provide a passenger side posture indicator 117 (which may be at the passenger side of the mirror) to alert a passenger of his or her bad posture. The icon and/or warning message may be displayed at or on the video mirror display screen or at or on any other of the vehicle's display screens (such as a center console display screen or the like).

Optionally, the system 110 may record the amount of time the driver has good posture versus bad posture and report the information to the vehicle as a matrix that the driver/passage can improve on over time. Thus, as the driver/passenger uses the system 110 over time, he or she can monitor progress and set goals for themselves.

Optionally, the system 110 may process captured image data to determine the driver's skeletal structure mapped from the driver's perceived body position. The system 110 may continually monitor the determined skeletal structure and compare it to a known best posture or a pre-set posture setting. Optionally, the system 110 may monitor the determined skeletal structure to determine a threshold change in posture over time (to determine a time-based posture change), and may alert the driver or passenger when the change exceeds a threshold amount over a given time period.

The interior rearview mirror assembly may comprise any suitable mirror assembly having a video display device disposed behind the mirror reflective element so as to be viewable through a partially reflective and partially visible light transmitting or transflective mirror reflector of the mirror reflective element when the display screen is powered. For example, and such as shown in FIG. 3, the interior rearview mirror assembly may comprise an auto-dimming electro-optic (such as electrochromic) mirror assembly that operates as a reflecting mirror when the display screen is off, and functions as a video mirror when the display screen is activated. Optionally, the mirror assembly may comprise a prismatic mirror reflective element (that is toggled between a daytime viewing position and a nighttime or anti-glare viewing position) having a video display screen disposed behind the transflective mirror reflector of the prismatic mirror reflective element.

The mirror head (including the mirror housing and reflective element and display) is mounted at a stay assembly or mounting structure, which is configured to attach at an interior portion of the vehicle (such as at an overhead console or headliner or at an in-cabin side of the vehicle windshield). The mirror head may be toggled between the mirror mode and the display mode by flipping a toggle tab at the bottom of the mirror head, which causes the mirror head to pivot about a generally horizontal pivot axis relative to the mirror stay.

The system may utilize aspects of the driver monitoring systems described in U.S. Pat. Nos. 10,065,574; 10,017,114; 9,405,120 and/or 7,914,187, and/or U.S. Publication Nos. US-2021-0323473; US-2021-0291739; US-2020-0202151; US-2020-0143560; US-2020-0320320; US-2018-0231976; US-2018-0222414; US-2017-0274906; US-2017-0217367; US-2016-0209647; US-2016-0137126; US-2015-0352953; US-2015-0296135; US-2015-0294169; US-2015-0232030; US-2015-0092042; US-2015-0022664; US-2015-0015710; US-2015-0009010 and/or US-2014-0336876, and/or U.S. patent application Ser. No. 17/450,721, filed Oct. 13, 2021, and/or U.S. provisional applications, Ser. No. 63/260,359, filed Aug. 18, 2021, Ser. No. 63/201,894, filed May 18, 2021, Ser. No. 63/201,757, filed May 12, 2021, Ser. No. 63/201,371, filed Apr. 27, 2021, Ser. No. 63/200,451, filed Mar. 8, 2021, Ser. No. 63/200,315, filed Mar. 1, 2021, Ser. No. 63/200,003, filed Feb. 9, 2021, which are hereby incorporated herein by reference in their entireties.

The cameras may comprise any suitable imaging sensor or camera, such as a pixelated imaging array or the like, such as a CMOS imaging array sensor, a CCD sensor or other sensors or the like, such as a camera or sensor of the types disclosed in commonly assigned, U.S. Pat. Nos. 7,965,336; 5,550,677; 5,760,962; 6,097,023 and 5,796,094, which are hereby incorporated herein by reference in their entireties. Optionally, the cameras may comprise a stereo imaging camera or the like, such as by utilizing aspects of the imaging systems described in U.S. Pat. Nos. 6,396,397 and/or 5,796,094, which are hereby incorporated herein by reference in their entireties. Optionally, the cameras may comprise an infrared or near infrared light sensitive camera and may be suitable for capturing images in low lighting conditions, and/or the camera may include or be associated with an illumination source (such as an infrared or near-infrared light emitting illumination source that, when actuated to emit infrared or near-infrared light at the side of the vehicle, enhances the camera's performance but is not visible or discernible to the driver of the vehicle), such as by utilizing aspects of the cameras described in U.S. Pat. Nos. 7,965,336; 5,550,677; 5,760,962; 6,097,023 and 5,796,094, which are hereby incorporated herein by reference in their entireties.

The mirror assembly may comprise any suitable construction, such as, for example, a mirror assembly with the reflective element being nested in the mirror casing and with a bezel portion that circumscribes a perimeter region of the front surface of the reflective element or with the mirror casing having a curved or beveled perimeter edge around the reflective element and with no overlap onto the front surface of the reflective element (such as by utilizing aspects of the mirror assemblies described in U.S. Pat. Nos. 7,184,190; 7,274,501; 7,255,451; 7,289,037; 7,360,932; 7,626,749; 8,049,640; 8,277,059 and/or 8,529,108, which are hereby incorporated herein by reference in their entireties), or such as a mirror assembly having a rear substrate of an electro-optic or electrochromic reflective element nested in the mirror casing, and with the front substrate having curved or beveled perimeter edges, or such as a mirror assembly having a prismatic reflective element that is disposed at an outer perimeter edge of the mirror casing and with the prismatic substrate having curved or beveled perimeter edges, such as described in U.S. Pat. Nos. 8,508,831; 8,730,553; 9,598,016 and/or 9,346,403, and/or U.S. Publication Nos. US-2014-0313563 and/or US-2015-0097955, which are hereby incorporated herein by reference in their entireties (and with electrochromic and prismatic mirrors of such construction are commercially available from the assignee of this application under the trade name INFINITY™ mirror).

The mirror assembly may include user inputs or actuatable switches or touch sensors or the like for user/driver control of one or more features of the mirror assembly and/or display system. The user inputs or touch sensors may comprise any suitable sensors or inputs, and may utilize aspects of the inputs and sensors described in U.S. Pat. Nos. 9,827,913; 9,598,016; 9,346,403; 8,508,831; 8,730,553; 7,224,324; 7,253,723; 7,255,451 and/or 8,154,418, which are hereby incorporated herein by reference in their entireties.

Changes and modifications to the specifically described embodiments may be carried out without departing from the principles of the present invention, which is intended to be limited only by the scope of the appended claims as interpreted according to the principles of patent law.

The invention claimed is:

1. A vehicular driver monitoring system, the vehicular driver monitoring system comprising:

a camera disposed in a cabin of a vehicle and viewing a driver operating the vehicle;

an electronic control unit (ECU) disposed at the vehicle, wherein the ECU comprises electronic circuitry and associated software, and wherein the electronic circuitry of the ECU comprises an image processor operable to process image data captured by the camera;

wherein the camera captures image data and provides captured image data to the ECU;

wherein the vehicular driver monitoring system, via processing captured image data at the ECU, determines posture of the driver operating the vehicle;

wherein the vehicular driver monitoring system, based at least in part on a comparison between the determined posture of the driver and a proper posture stored in memory, determines improper posture of the driver;

wherein the proper posture stored in memory is determined based at least in part on (i) a determined spinal position of the driver relative to a seat of the vehicle and (ii) a determined head position of the driver relative to an interior rearview mirror assembly of the vehicle; and wherein, responsive to the determined improper posture of the driver being indicative of at least a threshold degree of improper posture, the vehicular driver monitoring system generates an alert to the driver.

2. The vehicular driver monitoring system of claim 1, wherein the camera is disposed at an interior rearview mirror assembly of the vehicle.

3. The vehicular driver monitoring system of claim 1, wherein the threshold degree of improper posture is provided to the vehicular driver monitoring system by the driver.

4. The vehicular driver monitoring system of claim 1, wherein the threshold degree of improper posture is determined by the vehicular driver monitoring system via processing at the ECU of image data captured by the camera when the driver is operating the vehicle.

5. The vehicular driver monitoring system of claim 1, wherein the alert comprises actuation of a visible indicator that is viewable by the driver of the vehicle.

6. The vehicular driver monitoring system of claim 5, wherein the visible indicator is disposed at an interior rearview mirror assembly of the vehicle.

7. The vehicular driver monitoring system of claim 5, wherein the visible indicator comprises a light emitting diode.

8. The vehicular driver monitoring system of claim 5, wherein the alert comprises actuation of the visible indicator to emit red light.

9. The vehicular driver monitoring system of claim 5, wherein the visible indicator emits green light when the vehicular driver monitoring system is operating and the vehicular driver monitoring system does not determine improper posture.

10. The vehicular driver monitoring system of claim 5, wherein the visible indicator comprises an iconistic graphic overlay that is overlaid at video images displayed at a video display screen of the vehicle that is viewable by the driver of the vehicle.

11. The vehicular driver monitoring system of claim 10, wherein the video display screen is disposed at an interior rearview mirror assembly of the vehicle.

12. The vehicular driver monitoring system of claim 1, wherein the alert comprises an audible alert.

13. The vehicular driver monitoring system of claim 1, wherein the alert comprises a haptic alert.

14. The vehicular driver monitoring system of claim 1, further comprising another camera disposed in the cabin of the vehicle and viewing a passenger in the vehicle, and wherein the vehicular driver monitoring system, via processing at the ECU image data captured by the other camera, determines posture of the passenger in the vehicle, and wherein, responsive to the determined posture of the passenger being indicative of at least the threshold degree of improper posture, the vehicular driver monitoring system generates an alert to the passenger that the passenger has improper posture.

15. The vehicular driver monitoring system of claim 1, wherein the proper posture stored in memory is determined based at least in part on a determined head position of the driver relative to a steering wheel of the vehicle.

16. A vehicular driver monitoring system, the vehicular driver monitoring system comprising:
a camera disposed in a cabin of a vehicle and viewing a driver operating the vehicle, wherein the camera is disposed at an interior rearview mirror assembly of the vehicle;
an electronic control unit (ECU) disposed at the vehicle, wherein the ECU comprises electronic circuitry and associated software, and wherein the electronic circuitry of the ECU comprises an image processor operable to process image data captured by the camera;
wherein the camera captures image data and provides captured image data to the ECU;
wherein the vehicular driver monitoring system, via processing captured image data at the ECU, determines posture of the driver operating the vehicle;
wherein the vehicular driver monitoring system, based at least in part on a comparison between the determined posture of the driver and a proper posture stored in memory, determines improper posture of the driver;
wherein the proper posture stored in memory is determined based at least in part on (i) a determined spinal position of the driver relative to a seat of the vehicle and (ii) a determined head position of the driver relative to an interior rearview mirror assembly of the vehicle;
wherein, responsive to the determined improper posture of the driver being indicative of at least a threshold degree of improper posture, the vehicular driver monitoring system generates an alert to the driver; and
wherein the vehicular driver monitoring system determines that the determined improper posture of the driver is indicative of at least the threshold degree of improper posture when the determined posture of the driver differs from the proper posture stored in memory by at least a threshold amount.

17. The vehicular driver monitoring system of claim 16, wherein the threshold degree of improper posture is provided to the vehicular driver monitoring system by the driver.

18. The vehicular driver monitoring system of claim 16, wherein the alert comprises actuation of a visible indicator that is viewable by the driver of the vehicle.

19. The vehicular driver monitoring system of claim 18, wherein the visible indicator is disposed at the interior rearview mirror assembly of the vehicle.

20. The vehicular driver monitoring system of claim 16, wherein the alert comprises an audible alert.

21. The vehicular driver monitoring system of claim 16, wherein the alert comprises a haptic alert.

22. A vehicular driver monitoring system, the vehicular driver monitoring system comprising:
a camera disposed in a cabin of a vehicle and viewing a driver operating the vehicle;
an electronic control unit (ECU) disposed at the vehicle, wherein the ECU comprises electronic circuitry and associated software, and wherein the electronic circuitry of the ECU comprises an image processor operable to process image data captured by the camera;
wherein the camera captures image data and provides captured image data to the ECU;
wherein the vehicular driver monitoring system, via processing captured image data at the ECU, determines posture of the driver operating the vehicle;
wherein the vehicular driver monitoring system, based at least in part on a comparison between the determined posture of the driver and a proper posture stored in memory, determines improper posture of the driver;
wherein the proper posture stored in memory is determined based at least in part on (i) a determined spinal position of the driver relative to a seat of the vehicle and (ii) a determined head position of the driver relative to an interior rearview mirror assembly of the vehicle;
wherein, responsive to the determined improper posture of the driver being indicative of at least a threshold degree of improper posture, the vehicular driver monitoring system generates an alert to the driver;
wherein the proper posture of the driver is determined by the vehicular driver monitoring system via processing at the ECU of image data captured by the camera when the driver is initially operating the vehicle; and
wherein the vehicular driver monitoring system determines that the determined improper posture of the driver is indicative of at least the threshold degree of improper posture when the determined posture of the driver is different from the determined proper posture stored in memory by at least a threshold amount.

23. The vehicular driver monitoring system of claim 22, wherein the alert comprises actuation of a visible indicator that is viewable by the driver of the vehicle.

24. The vehicular driver monitoring system of claim 23, wherein the visible indicator is disposed at an interior rearview mirror assembly of the vehicle.

25. The vehicular driver monitoring system of claim 23, wherein the alert comprises actuation of the visible indicator to emit red light.

26. The vehicular driver monitoring system of claim 23, wherein the visible indicator emits green light when the vehicular driver monitoring system is operating and the vehicular driver monitoring system does not determine improper posture.

27. The vehicular driver monitoring system of claim 23, wherein the visible indicator comprises an iconistic graphic overlay that is overlaid at video images displayed at a video display screen of the vehicle that is viewable by the driver of the vehicle.

28. The vehicular driver monitoring system of claim 27, wherein the video display screen is disposed at an interior rearview mirror assembly of the vehicle.

\* \* \* \* \*